United States Patent [19]
Arthur et al.

[11] Patent Number: 6,034,505
[45] Date of Patent: Mar. 7, 2000

[54] RECHARGEABLE CHARGING CRADLE AND NIGHT LIGHT

[75] Inventors: Brian A. Arthur, E. Greenwich, R.I.; David S. Nierescher, Newcastle, Wash.

[73] Assignee: SelfCharge Inc., Redmond, Wash.

[21] Appl. No.: 09/127,862

[22] Filed: May 20, 1998

Related U.S. Application Data

[60] Provisional application No. 60/047,301, May 20, 1997.

[51] Int. Cl.$^7$ .................................................. H01M 10/46
[52] U.S. Cl. .......................................... 320/113; 320/115
[58] Field of Search ..................................... 320/107, 111, 320/112, 113, 114, 115; D13/103, 107, 108; 429/96, 100

[56] References Cited

U.S. PATENT DOCUMENTS

| | | | |
|---|---|---|---|
| 5,160,879 | 11/1992 | Tortola et al. | 320/111 |
| 5,721,481 | 2/1998 | Narita et al. | 320/111 |
| 5,731,683 | 3/1998 | Nakanishi | 320/111 |
| 5,736,837 | 4/1998 | Noda | 320/111 |
| 5,844,472 | 12/1998 | Lee | 320/111 X |
| 5,847,541 | 12/1998 | Hahn | 320/111 |
| 5,859,523 | 1/1999 | Nierescher et al. | 320/111 |

*Primary Examiner*—Edward H. Tso
*Attorney, Agent, or Firm*—Christensen O'Connor Johnson & Kindness PLLC

[57] ABSTRACT

A rechargeable apparatus for mounting onto a battery-powered device and providing power. The apparatus includes a housing for slideably receiving the battery-powered device, a jack that is insertable into a power outlet on the battery-powered device, a rotatable AC plug mounted to the housing, and a night light coupled to the AC plug and positioned on the housing to supply illuminating light. Also, the apparatus includes at least one rechargeable battery and a charging circuit mounted inside the housing. The jack and night light may be mounted on a support arm that extends away from the housing.

11 Claims, 6 Drawing Sheets

RECHARGEABLE CHARGING CRADLE AND NIGHT LIGHT

This application claims the benefit of U.S. Provisional Application No. 60/047,301, filed May 20, 1997.

FIELD OF THE INVENTION

The invention relates to a rechargeable power pack for hand-held battery-powered devices.

BACKGROUND OF THE INVENTION

Rechargeable batteries used in hand-held battery-powered devices tend to provide power for approximately two hours when fully charged. This greatly limits operating time of the device. Battery and device manufacturers are continually searching for ways for extending battery life, thereby extending device operating time. The following are techniques for getting the most operating time from devices that use rechargeable batteries.

One method is to recharge the rechargeable batteries by removing them from the battery-powered device and inserting them into a recharging stand. Although recharging stands are an effective way for recharging multiple batteries, the recharging stands are quite large and thus take up valuable space and weight in a travel bag if one is to get use from it while traveling.

Tortola et al., U.S. Pat. No. 5,160,879, discloses a rechargeable power pack unit that connects by a cord to a battery-powered device for providing power. The power pack includes a plug that inserts into an AC outlet, thereby receiving AC power that is translated into a DC signal for recharging the rechargeable batteries within the power pack. When the power pack is not connected to an AC outlet and is connected by a jack to a battery-powered device, the rechargeable batteries within the power pack discharge a DC current for powering the device. Essentially, Tortola et al.'s power pack is an additional power source for a battery-powered device, thereby extending operating time of the device. However, this power pack is quite cumbersome. If the battery-powered device is a hand-held game such as a Nintendo® Gameboy®, the cord and power pack become an inconvenience to the operator who may tend to move the Gameboy® in an exaggerated fashion in order to operate effectively.

SUMMARY OF THE INVENTION

In accordance with this invention a rechargeable apparatus for mounting onto a battery-powered device and providing power is provided. The apparatus includes a housing for slideably receiving the battery-powered device, a jack that is insertable into a power outlet on the battery-powered device, a rotatable AC plug mounted to the housing, and a night light coupled to the AC plug and positioned on the housing to supply illuminating light. Also, the apparatus includes at least one rechargeable battery and a charging circuit mounted inside the housing.

In accordance with other aspects of this invention, the jack and night light are mounted on a support arm that extends away from the housing.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
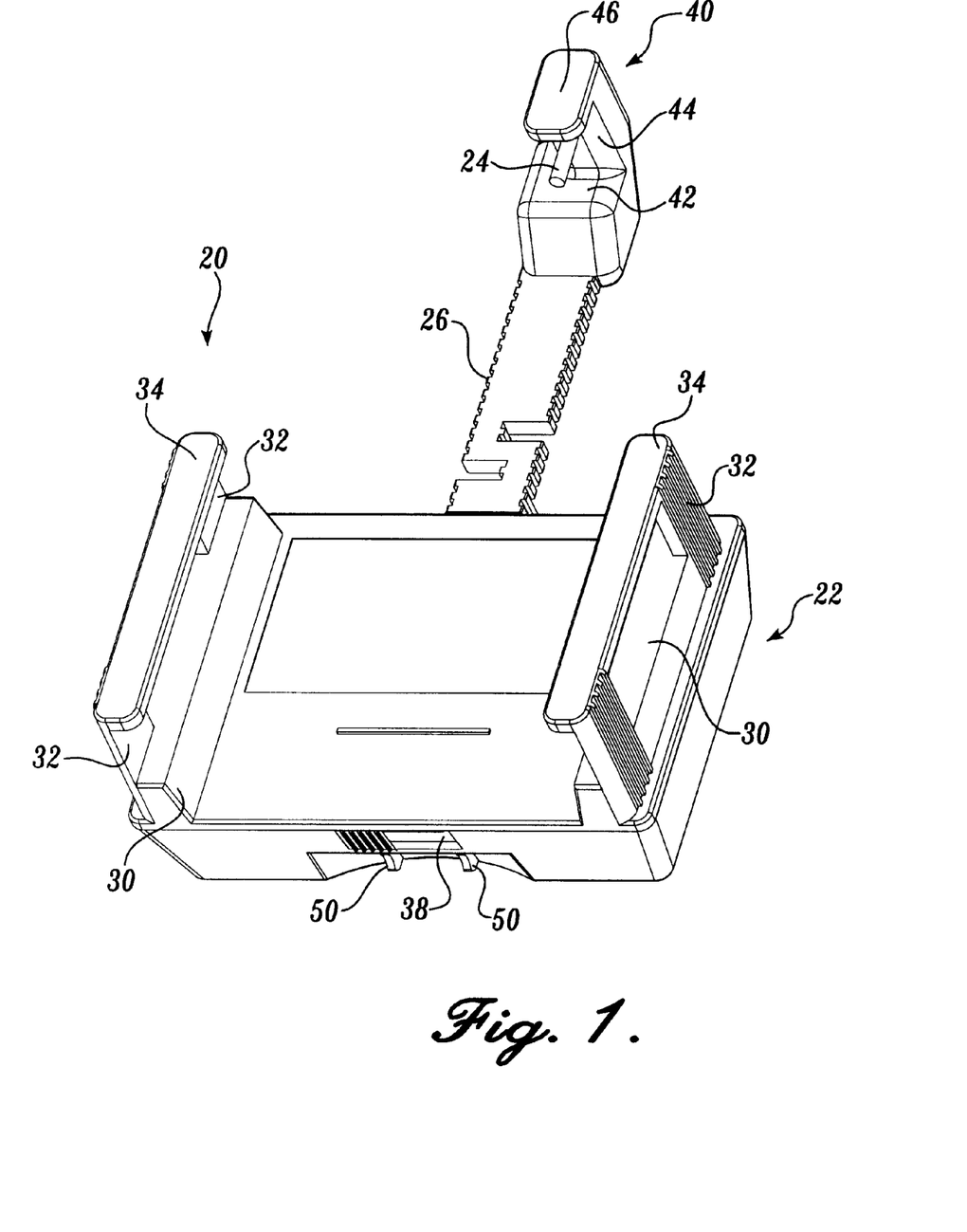
FIGS. 1 and 2 are perspective views of a first embodiment of the rechargeable charging cradle and night light.

FIG. 1 is a perspective view of a first embodiment of a rechargeable charging cradle and night light formed in accordance with the present invention. The rechargeable charging cradle and night light 20 includes a main housing 22 with a power jack 24 connected to the main housing 22 by a semiflexible powering arm 26 longitudinally mounted on the main housing 22. The main housing 22 is primarily rectangular in shape with a width slightly wider than that of the battery-powered device.

On a first side of the main housing 22 are device supports. The device supports include two raised platforms 30 mounted longitudinally near the outer edges of the first side. Mounted outward of each raised platform 30 and to the corners of the main housing 22 are four support structures 32 (one approximately at each corner of the housing 22). The support structures 32 are column-like supports that extend orthogonally from the surface of the first side. Mounted between each pair of supports 32 are one of the raised platforms 30 at one end and a single flange 34 that resembles a popsicle stick at the other end. Flange 34 is longitudinally positioned between the supports 32, thereby providing a cavity or track between flange 34 and platform 30. The track is sufficiently wide enough to slide the battery-powered device through without interfering with any controls or displays on the device.

Figure 2:
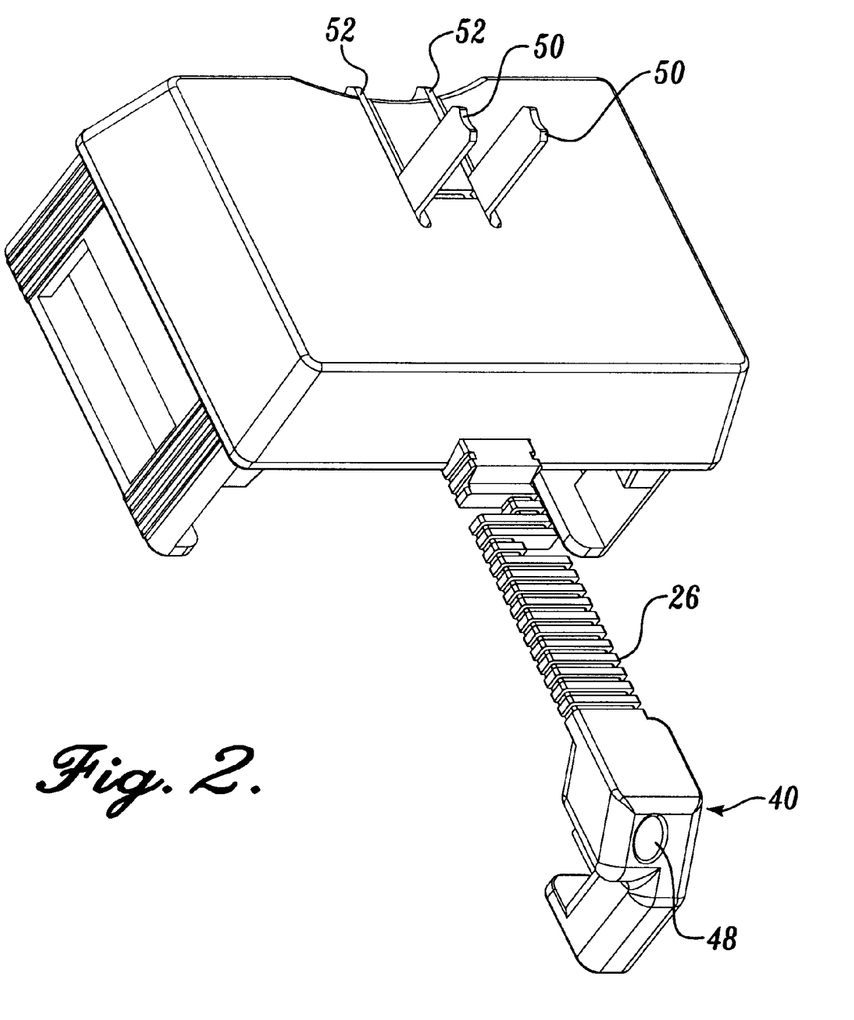

Referring to FIGS. 1 and 2, the powering arm connects to a second side of the main housing 22. The second side of the main housing 22 is orthogonal to the first side of the main housing 22. The powering arm 26 extends orthogonally away from the second side. The powering arm 26 is formed of a semirigid plastic material formed in the shape of an S at the end closest to the main housing 22. This design and material allow the arm 26 to be functionally flexible. Connected at the other end of the powering arm 26 is a jack and light support 40. The jack and light support 40 includes a base portion 42 connected to the powering arm 26, a back plate 44 that extends orthogonally away from the base portion 42, and a cover flange that extends away from back plate 44 back towards the main housing 22. The base portion 42, the back plate 44 and the cover flange 46 form a smaller support track equal in width to the device support track and is located at a 90° distance from the first side equal to that of the track in the device support track. The three tracks formed all have their opening facing the center of the main housing 22. Mounted into the surface of the back plate 44 within the support track is the power jack 24. Mounted flush to the outer surface of the base portion 42 is night light 48.

Rotatably mounted to a third side of the main housing 22 are plug prongs 50. The third side is opposite the first side. Plug prongs 50 rotate between two operating positions. In a first position, the plug prongs 50 are contained within plug prong cavities 52. The cavities 52 allow the plug prongs 50 to be flush with the third side of the main housing 22. When the plug prongs 50 are in the second position, they extend away from the main housing 22 to a position orthogonal to the third side.

Mounted on a fourth side of the main housing 22 is a slideable switch 38 for controlling the modes of operation of the rechargeable charging cradle and night light 20. The fourth side is orthogonal to the first side and opposite the second side. When the plug prongs 50 are recessed into cavities 52, their ends extend into a cavity cut from the fourth side. Each of the plug prongs 50 have concave tips, thereby allowing for easy user interaction.

Inside housing 22 are rechargeable batteries 58 and a charging circuit 60. It ca be appreciated to those of ordinary skill in the art of charging circuits, that the specifics of the charging circuit are dependent upon the type and size of rechargeable batteries and received AC voltage values.

Figure 3:
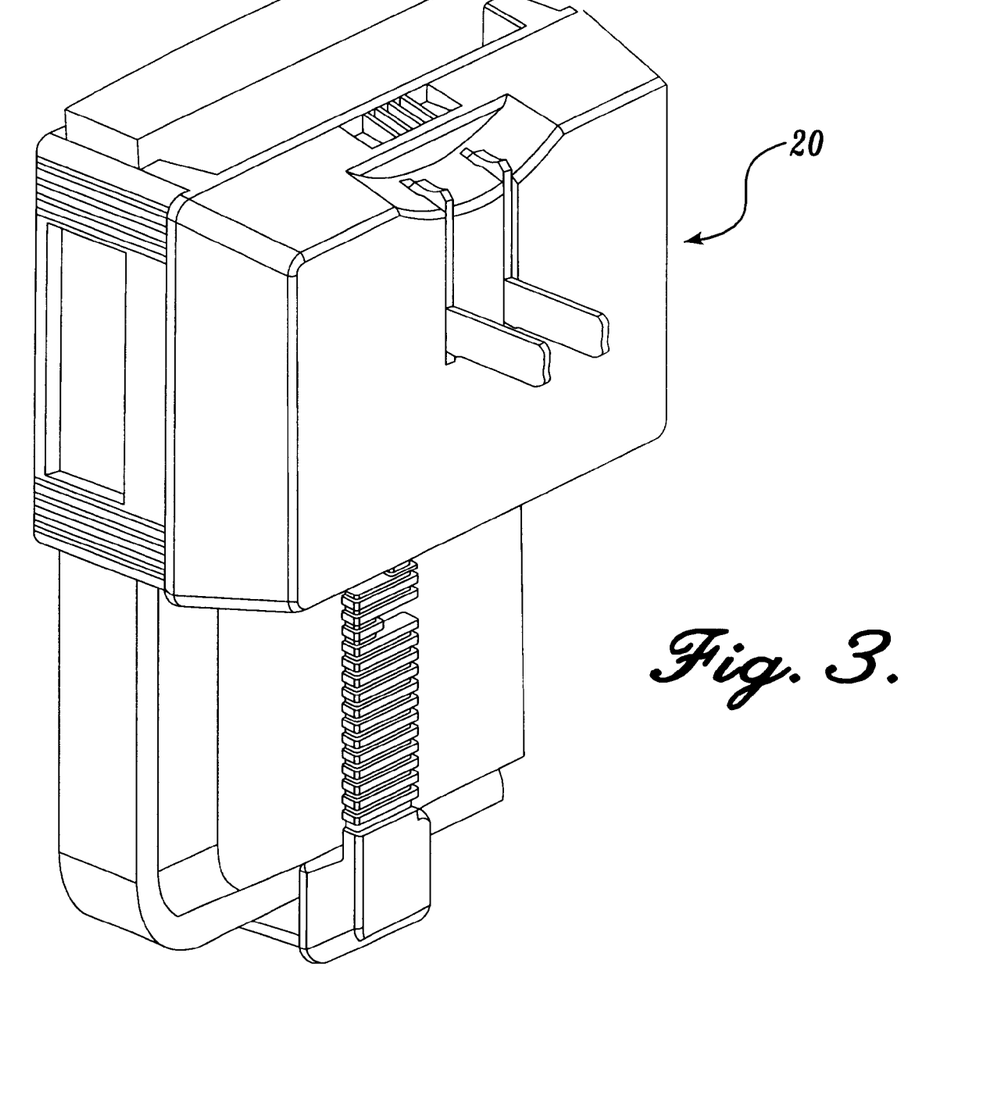
FIG. 3 is a perspective view of the rechargeable charging cradle of FIGS. 1 and 2 connected to a battery-powered computer game device.

As shown in FIG. 3, a battery-powered device slides through the supports on the housing 22 and into the support created by the jack and light support 40. In this position, the jack inserts into the DC receiving socket on the battery-powered device.

When a battery-powered device is connected to the rechargeable charging cradle 20, the battery pack can operate in one of two modes. The switch position determines the operating mode. When the switch is in a first position, the rechargeable batteries supply power to the device through the DC jack. The prongs 50 and night light 48 are disconnected from all other components. When the switch is in a second position and the plug prongs 50 are rotated to the charging position, the plug prongs 50 connect to the rechargeable batteries through the charging circuit 60 and no connection is made between the jack 24 and the rechargeable batteries. Also, the night light 48 connects to the prongs 50. If the prongs 50 are then inserted in an AC outlet, AC power is supplied to the charging circuit 60. The charging circuit 60 translates the AC voltage into a DC voltage required to charge the rechargeable batteries. Therefore, the preferred usage is to have the rechargeable charging cradle and night light 20 always mounted to the device, thereby providing extended operating power to the device or a cradle for storage.

Figure 4:
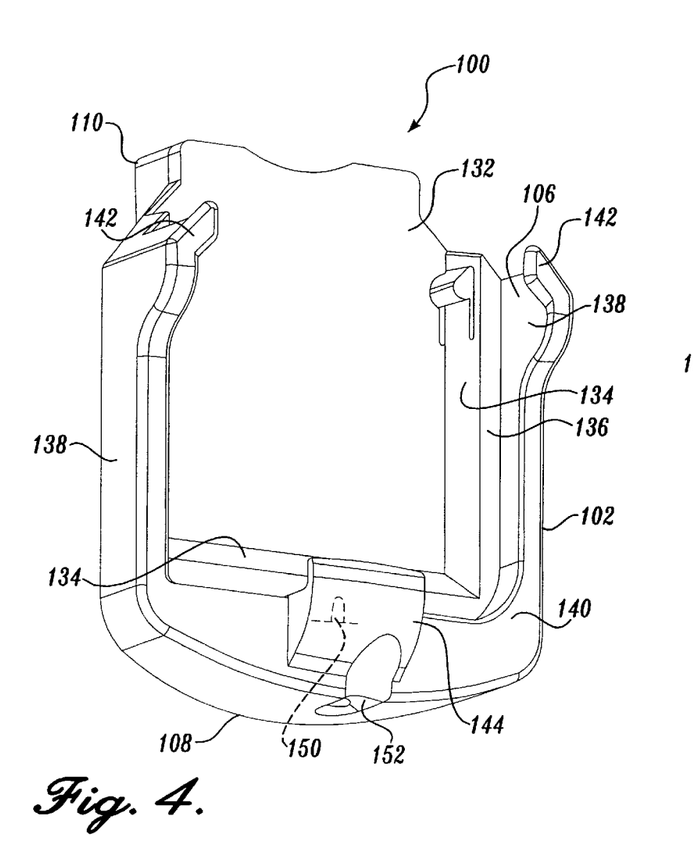
FIGS. 4 and 5 are perspective views of a second embodiment of the rechargeable charging cradle and night light.

FIG. 4 is a perspective view of a second embodiment of a rechargeable charging cradle and night light formed in accordance with the present invention. The second embodiment of the rechargeable charging cradle and night light 100 includes a main housing 102 that includes a top and a bottom piece 108 and 110. The bottom piece 110 includes four side walls 118–121 and a bottom side 124. The bottom side 124 includes ridges for providing gripping of the rechargeable charging cradle and night light 100. Attached at approximately the top edge of the two longer side walls 118 and 119 and one of the shorter side walls 120 is a backplate surface 126. The backplate surface 126 is sufficiently wide enough to allow the bottom piece 110 to fully receive the top piece 108.

Rotatably mounted to the bottom piece 110 are plug prongs 114. Plug prongs 114 rotate between two operating positions. In a first position, the plug prongs 114 are contained within plug prong cavities 116. The cavities 116 allow the plug prongs 114 to be flush with the bottom piece 110, as shown in FIG. 4. When the plug prongs 114 are recessed, their ends are approximately flush with a curved indent on the side wall 121. When the plug prongs 114 are in the second position (not shown), they extend away from the main housing 102 to a position orthogonal to the bottom side 124.

Figure 5:
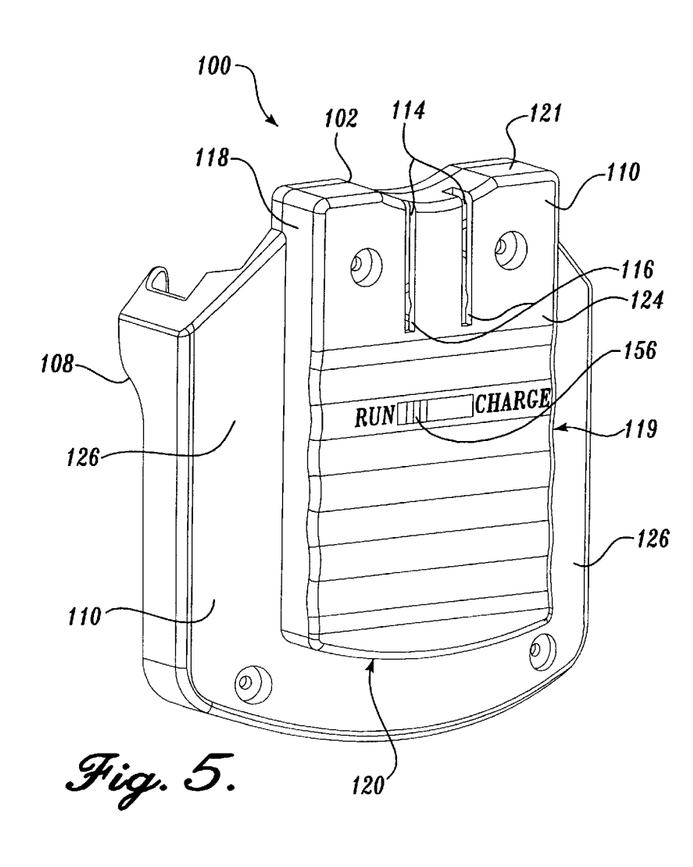

The top piece 108 of the main housing 102 is formed to slideably receive the battery-powered device. The top piece 108 includes a receiving cavity or track for slideably receiving the battery-powered device. The receiving cavity or track is multi-level for receiving a battery-powered device that is not a perfect boxed rectangle, such as Nintendo® Gameboy®. The bottom surface 132 is approximately rectangular in shape with two side edges and a top and bottom edge. The first level of the receiving cavity or track is formed by a bottom surface 132 and side walls 134 that are attached to the bottom surface 132. The side walls 134 are attached at greater than a 90° along the two side edges and the bottom edge of the bottom surface 132. The side walls 134 extend away from the center of the bottom surface 132.

A second level of the receiving cavity or track is a square C-shaped cavity that extends above the side walls 134. Extending from the top of the side walls 134 is a platform surface 136 that forms the base of the C-shaped cavity . The platform surface 136 is approximately parallel to the bottom surface 132. A second level side wall 138 is mounted to the outside edge of the platform surface 136 along the two side edges of bottom surface 132. The second level side wall 138 is approximately orthogonal to the platform surface 136. The second level side wall 138 extends below the platform surface 136 to mate with the backplate surface 126 of the bottom piece 110. Also, the second level side wall 138 extends above the platform surface 136 to mount to a flange 140. The flange 140 is mounted to the second level side wall 138 to be approximately opposite and parallel to the platform surface 136. The second level side wall 138 is slightly longer at the ends of the second level side wall 138 opposite the bottom edge of the bottom surface 132. The flange 140 at the slightly longer parts of the second level side wall 138 form tabs 142 that make contact with the top surface of the battery-powered device when the device is properly inserted, as shown in FIG. 6.

Figure 6:
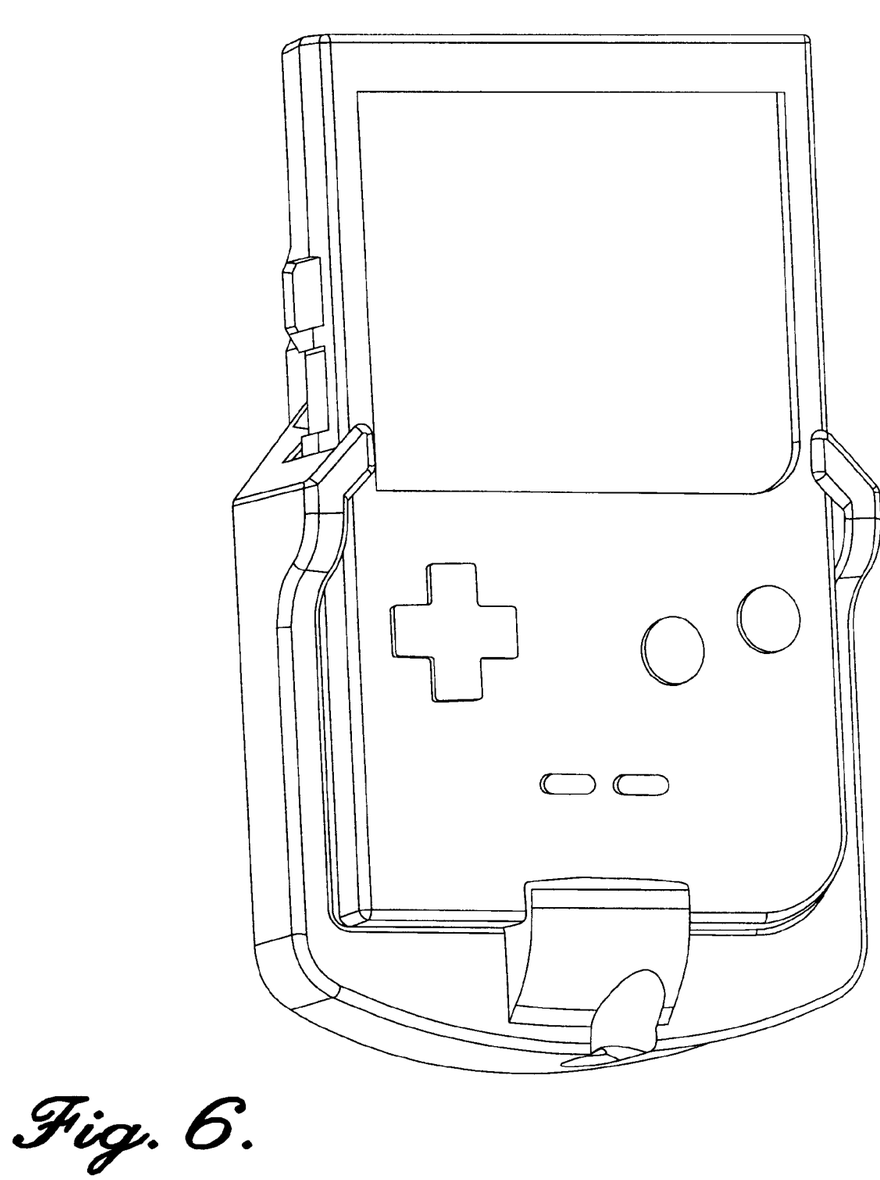
FIG. 6 is a perspective view of the second embodiment of the rechargeable charging cradle of FIGS. 4 and 5 connected to a battery-powered computer game device.
Figure 7:
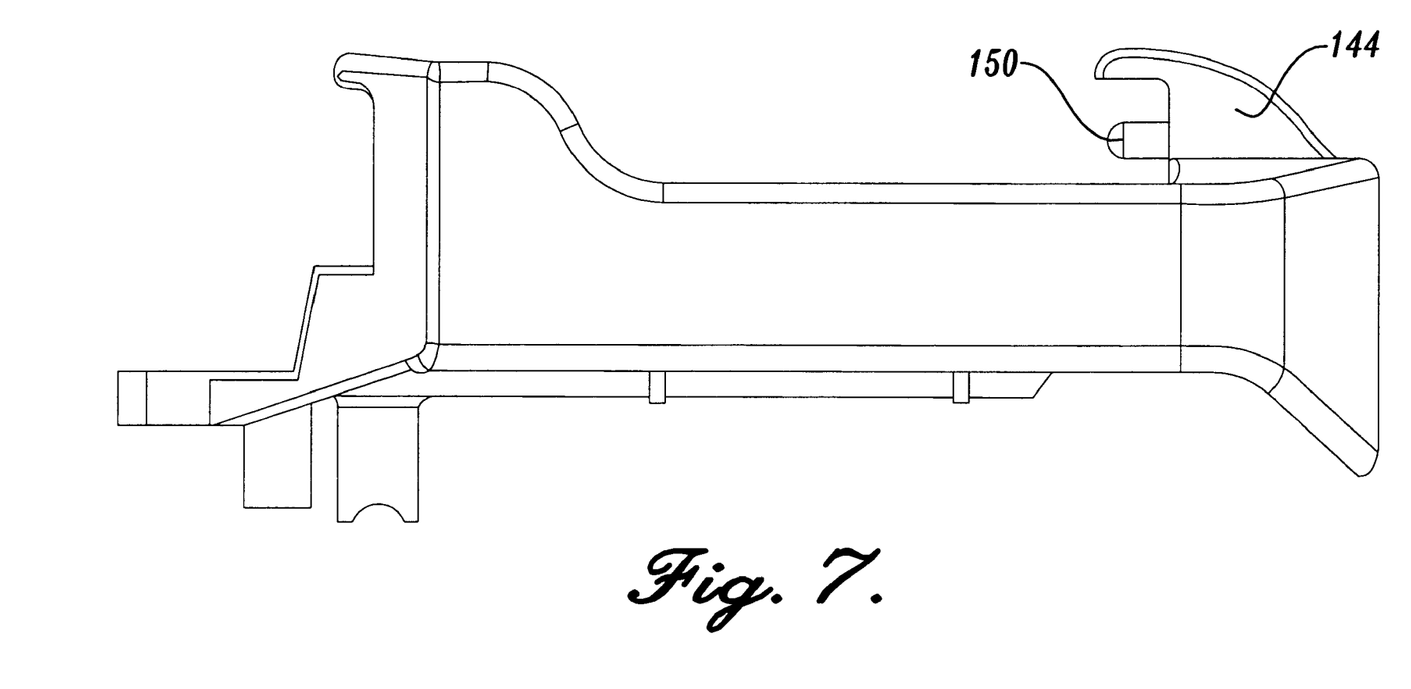
FIG. 7 is a side view of the second embodiment of the rechargeable charging cradle of FIGS. 4 and 5.

As shown in FIG. 7, a base tab 144 is mounted on the flange 140 above the bottom edge of the bottom surface 132. The base tab 144 extends to a distance away from the bottom surface 132 approximately equal to that of the tabs 142. The base tab 144 extends over the created cavity for making contact with the top surface of the battery-powered device when the device is properly inserted, as shown in FIG. 6. The top and bottom piece 108 and 110 form first and second internal cavities. The first cavity is formed by the four sides 118–121 and the bottom side 124 of the bottom piece 110 and the bottom surface 132 of the top piece 108. The second cavity is formed at about the bottom edge of the bottom surface 132 by the backplate surface 126 of the bottom piece 110 and the second level side wall 138 and flange 140. The first cavity includes rechargeable batteries and a charging circuit (not shown). The second cavity includes connections for a power jack 150 and a socket for a night light 152. The power jack 150 protrudes from the second cavity between the bottom surface 132 and the base tab 144.

As shown in FIG. 6, when the battery-powered device slides into the rechargeable charging cradle and night light 100, the power jack 150 inserts into the DC receiving socket on the battery-powered device.

Mounted on the bottom side 124 of the main housing 22 is a slide switch 156 for controlling the modes of operation of the rechargeable charging cradle and night light 100. The operation of the rechargeable charging cradle and night light 100 is similar to that describe above for rechargeable charging cradle and night light 20.

While the preferred embodiment of the invention has been illustrated and described, it will be appreciated that various changes ca be made therein without departing from the spirit and scope of the invention.

The embodiments of the invention in which an exclusive property or privilege is claimed are defined as follows:

1. A rechargeable cradle and power supply unit for mounting onto a battery-powered device and providing power thereto, the battery-powered device includes an upper side and a lower side, the upper side being useable for interfacing with a user, said cradle and power supply comprising:
    a housing for slideably receiving the battery-powered device in a manner that allows the upper side to remain unencumbered;
    a jack wherein the jack is insertable into a power outlet on the battery-powered device;
    a rotatable AC plug mounted to the housing, wherein the AC plug is insertable into an AC outlet;
    at least one rechargeable battery and a charging circuit mounted inside the housing; and
    a switch coupled to the AC plug, the jack, the at least one rechargeable battery and the charging circuit for controlling the operation of the unit; the switch including a first position in which the AC plug is connected to the charging circuit to recharge the at least one rechargeable battery, the AC plugs being disconnected from powering the battery-powered device; and the switch including a second position in which the jack is connected to the at least one rechargeable battery to allow the at least one rechargeable battery to power the battery-powered device, the AC plug being disabled from recharging the at least one rechargeable battery.

2. The unit of claim 1, further comprising:
    a night light coupled to the AC plug via the switch and positioned on the housing to supply illuminating light.

3. The unit of claim 2, wherein if the switch is in the first position, the AC plug is connected to the charging circuit and the night light.

4. The unit of claim 1, further comprising:
    a night light coupled to the AC plug and positioned on the support arm to supply illuminating light.

5. The unit of claim 4, wherein if the switch is in the first position, the AC plug is connected to the charging circuit and the night light.

6. The unit of claim 1, wherein the housing is a substantially flat rectangular shape having a first and second main sides, the first main side being opposite the second main side; the housing further including flanged side supports extending outward from the first main side and a support arm extending longitudinally from one end of the housing, the jack being located at the distal end of the support arm;
    wherein during use, the battery-powered device is slideably received between the flanged side supports and the jack engages the device; the lower side of the battery-powered device is adjacent the first main side of the housing so that the upper side of the battery-powered device faces outward.

7. The unit of claim 6, wherein the support arm is made of a flexible material.

8. The unit of claim 6, wherein the rotatable AC plug is positioned to extend from the housing second main side and the switch is located on the housing on an end opposite the support arm.

9. The unit of claim 6, further comprising a night light coupled to the AC plug via the switch and positioned on the support arm to supply illuminating light.

10. The unit of claim 1, wherein the housing is a substantially flat rectangular shape having a top piece, the top piece includes side walls and an end wall that form a three-sided cavity to slideably receive the device, the jack is located on the end wall and faces inward to engage the battery-powered device; the upper side of the battery-powered device faces outward.

11. The unit of claim 10, further comprising a night light coupled to the AC plug via the switch and positioned on the top piece near the jack to supply illuminating light.

* * * * *

UNITED STATES PATENT AND TRADEMARK OFFICE
CERTIFICATE OF CORRECTION

PATENT NO.    : 6,034,505
DATED         : March 7, 2000
INVENTOR(S)   : B.A. Arthur et al.

It is certified that error appears in the above-identified patent and that said Letters Patent is hereby corrected as shown below:

Title page,
Item [73], Assignee, "SelfCharge" should read -- SelfCHARGE --

Column 5,
Line 26, "AC plugs" should read -- AC plug --

Signed and Sealed this

Thirty-first Day of December, 2002

JAMES E. ROGAN
*Director of the United States Patent and Trademark Office*